United States Patent [19]

Wizman et al.

[11] Patent Number: 5,074,159
[45] Date of Patent: Dec. 24, 1991

[54] GYROSCOPIC SENSOR LOCK FOR NAVIGATION APPARATUS

[75] Inventors: Mark Wizman, Rishon Lezion; Rachel Naor, Nes Ziona, both of Israel

[73] Assignee: Israel Aircraft Industries Ltd., Ben Gurion Internat'l Airport, Israel

[21] Appl. No.: 403,350

[22] Filed: Sep. 6, 1989

[30] Foreign Application Priority Data

Sep. 7, 1988 [IL] Israel .................................. 87702

[51] Int. Cl.$^5$ ............................................. G01C 19/30
[52] U.S. Cl. ........................................ 74/5.47; 74/5.41
[58] Field of Search .................. 74/5.41, 5.47, 5.34

[56] References Cited

U.S. PATENT DOCUMENTS

| 2,603,003 | 7/1952 | Braddon | 74/5.34 |
| 3,232,122 | 2/1966 | Bock et al. | 74/5.34 |
| 3,308,670 | 3/1967 | Granqvist | 74/5.34 |
| 4,283,960 | 8/1981 | Quermann | 74/5.41 |
| 4,442,723 | 4/1984 | Auer | 74/5.41 X |

FOREIGN PATENT DOCUMENTS

| 247265 | 8/1925 | United Kingdom . |
| 525697 | 2/1939 | United Kingdom . |
| 1023903 | 9/1964 | United Kingdom . |
| 1332911 | 12/1970 | United Kingdom . |
| 1353285 | 8/1972 | United Kingdom . |

Primary Examiner—Rodney H. Bonck
Attorney, Agent, or Firm—Amster, Rothstein & Ebenstein

[57] ABSTRACT

An inertial sensor block comprising a sensor block base, an inertial sensors mounting element rotatably mounted with respect to the sensor block base for rotation about a rotation axis and a gyroscope mounted onto the mounting element and having its gyroscope spin axis inclined with respect to the rotation axis.

9 Claims, 1 Drawing Sheet

5,074,159

GYROSCOPIC SENSOR LOCK FOR NAVIGATION APPARATUS

FIELD OF THE INVENTION

The present invention relates to inertial navigation systems generally and more particularly to inertial sensor blocks.

BACKGROUND OF THE INVENTION

Inertial navigation systems incorporating gyroscopes and accelerometers are known for various applications.

In currently used navigation systems, a considerable degree of error results from inaccuracies in parameters such as gyroscope drift, G-sensitive drift and accelerometer bias.

These parameters do not have a constant value. They vary whenever the system is turned on and also periodically in the course of operation.

SUMMARY OF THE INVENTION

The present invention seeks to provide an improved sensor block for use in inertial navigation systems.

There is thus provided in accordance with a preferred embodiment of the present invention an inertial sensor block comprising a sensor block base, an inertial sensors mounting element rotatably mounted with respect to the sensor block base for rotation about a rotation axis and a gyroscope mounted onto the mounting element and having its gyroscope spin axis inclined with respect to the rotation axis.

In accordance with a preferred embodiment of the invention, the gyroscope spin axis is inclined with respect to the rotation axis by 45°.

Additionally in accordance with a preferred embodiment of the invention, the gyroscope comprises a double axis gryoscope or alternatively, at least two single axis gyroscopes.

Further in accordance with a preferred embodiment of the invention there is provided indexing apparatus for selectably rotating the mounting element relative to the sensor block base about the rotation axis.

Additionally in accordance with a preferred embodiment of the invention, the indexing apparatus is operative to rotate the mounting element to orientations separated from a reference position by 180° and 90°.

Further in accordance with a preferred embodiment of the present invention, there are provided at least two accelerometers on the mounting element, whereby both gyrocompassing and navigation are provided by the combination of the accelerometers and the gyroscope. Alternatively, at least two level meters may replace the at least two accelerometers.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
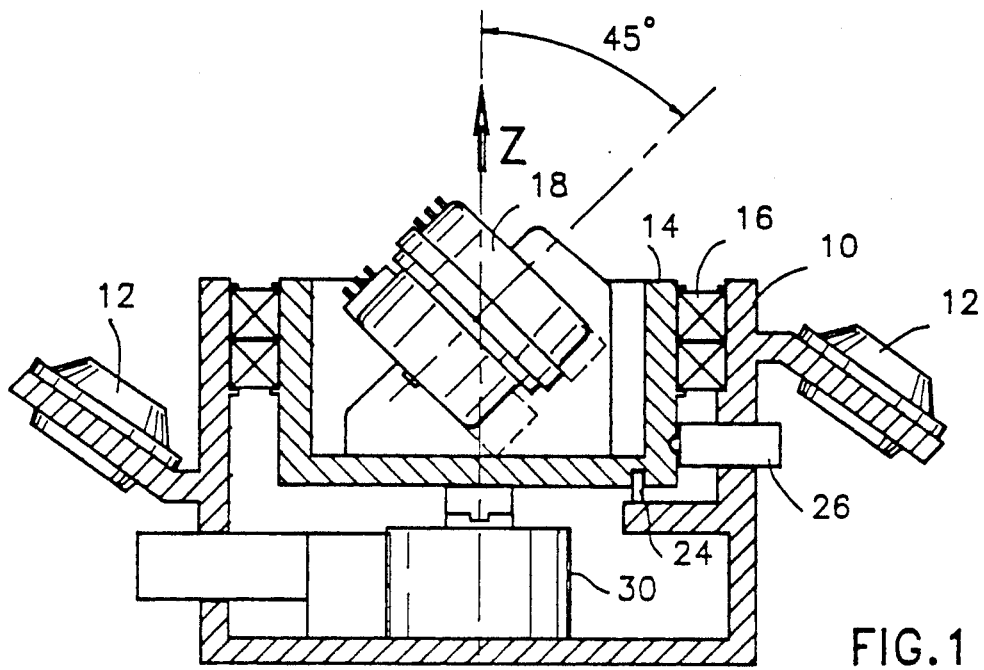
FIG. 1 is a side view sectional illustration of an inertial sensor block constructed and operative in accordance with a preferred embodiment of the present invention.
Figure 2:
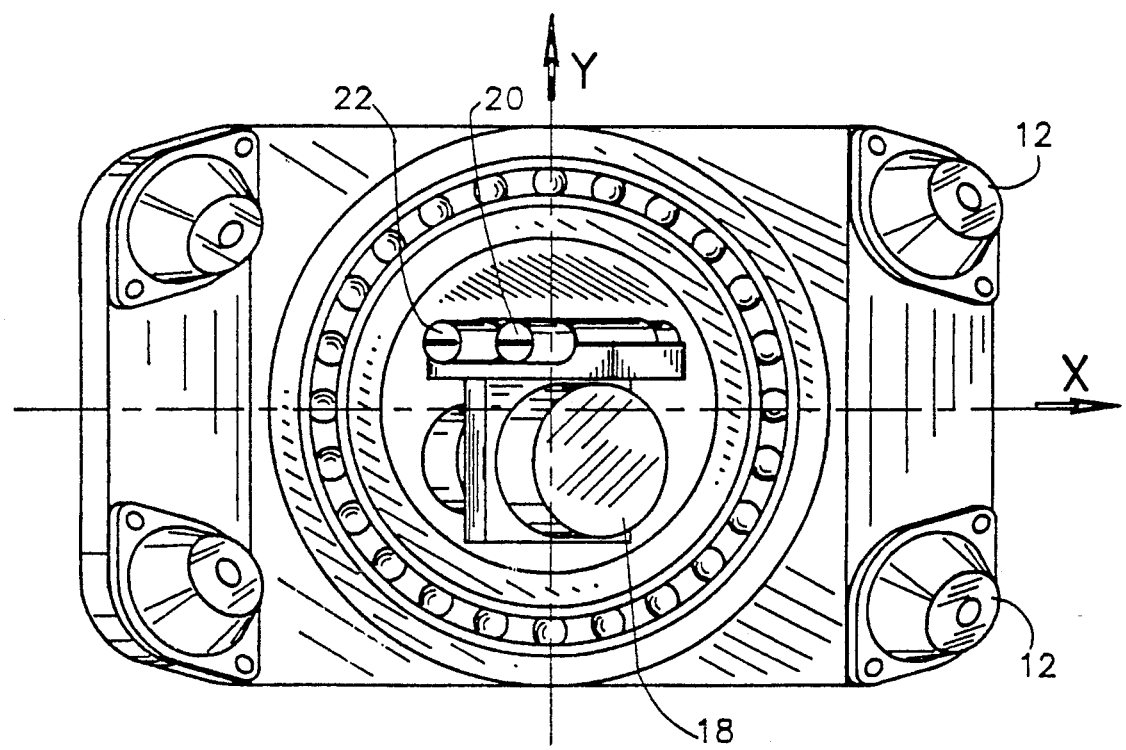
FIG. 2 is a top view illustration of the sensor block of FIG. 1.

Reference is now made to FIGS. 1 and 2, which illustrate a sensor block constructed and operative in accordance with a preferred embodiment of the invention and comprising a sensor block base 10 which is preferably associated with a plurality of shock mounts 12. A sensor mounting member 14 is rotatably mounted on base 10 for rotation about a rotation axis indicated as the Z-axis. Preferably, the rotational mounting is effected via a pre-loaded ball bearing 16.

Fixedly mounted onto the sensor mounting member 14 are a double-axis gyroscope 18, such as the Minitune gyroscope manufactured by Tamam Division of Israel Aircraft Industries of Israel. Alternatively, double-axis gryoscope 18 may be replaced by two single axis gyroscopes. Also fixedly mounted onto the sensor mounting member 14 are first and second single axis accelerometers 20 and 22. Alternatively, accelerometers 20 and 22 may be replaced by two level meters.

There is also provided a 0° and 180° stop 24 and a 90° locking device 26 associated with the block base 10 for precisely defining indexing positions.

It is a particular feature of the present invention that the gyroscope 18 is mounted with its spin axis inclined at 45 degrees with respect to the axis of rotation, i.e. the Z-axis. This inclined arrangement of the gyroscope with respect to the rotation axis permits simultaneous extraction of the gyroscope drift and G-sensitive drift parameters for the gyroscope.

In accordance with the present invention, once installed inside the navigation system, the gyroscope's spin axis is horizontal when the sensor block is in the 0° position. The gyroscope's spin axis is vertical when the block is in the 180° position. The gyroscope's spin axis is inclined at a 45° angle from the vertical Z-axis when the sensor block is in the 90° position.

Once in the above positions, the following operations take place:

1. At the 0° position, navigation takes place using one sensitive axis of the gyroscope.
2. At 180° and 0° gyroscope compassing takes place.
3. At the 90° position, the second sensitive axis is read so that the readings can be used during navigation for increased accuracy.

During the gyrocompassing, the accelerometers extract data representing the misleveling of the sensor block.

Indexing of the mounting member 14 relative to block base 10 is preferably provided by a drive unit 30, incorporating a brushless DC motor, a reduction gear, and a worm drive.

It will be appreciated by persons skilled in the art that the present invention is not limited by what has been particularly shown and described hereinabove. Rather the scope of the present invention is defined only by the claims which follow.

We claim:

1. An inertial sensor block comprising:
   a sensor block base;
   an inertial sensors mounting element rotatably mounted with respect to said sensor block base for rotation about a rotation axis;
   indexing means for selectably rotating said mounting element relative to said sensor block base about said rotation axis;

a gyroscope mounted onto said mounting element and having its gyroscope spin axis inclined at a fixed predetermined angle, other than 90°, with respect to said rotation axis; and at least one accelerometer mounted onto said mounting element.

2. An inertial sensor block according to claim 1 and wherein said gyroscope spin axis is inclined with respect to said rotation axis by 45°.

3. An inertial sensor block according to claim 2 and wherein said gyroscope comprises a double axis gyroscope.

4. An inertial sensor block according to claim 3, and wherein said double axis gyroscope means comprises a double axis gyroscope.

5. An inertial sensor block according to claim 1 and wherein said gyroscope comprises double axis gyroscope means.

6. An inertial sensor block according to claim 5, and wherein said double axis gyroscope means comprises a double axis gyroscope.

7. An inertial sensor block according to claim 1 and wherein said indexing means is operative to rotate said mounting element to orientations separated from a reference position by 180° and 90°.

8. An inertial sensor block according to claim 1, and wherein said at least one accelerometer comprises two accelerometers.

9. An inertial sensor block comprising:

a sensor block base;

an inertial sensors mounting element rotatably mounted with respect to said sensor block base for rotation about a rotation axis;

indexing means for selectably rotating said mounting element relative to said sensor block base about said rotation axis;

a gyroscope mounted onto said mounting element and having its gyroscope spin axis inclined at a fixed predetermined angle, other than 90°, with respect to said rotation axis; and at least two level meters mounted on said mounting element.

* * * * *